United States Patent
Criel

(10) Patent No.: US 10,752,107 B2
(45) Date of Patent: Aug. 25, 2020

(54) TANK COMPRISING A REINFORCEMENT MEMBER AND METHOD FOR MANUFACTURING SUCH A REINFORCEMENT MEMBER

(71) Applicant: Plastic Omnium Advanced Innovation and Research, Brussels (BE)

(72) Inventor: Bjorn Criel, Sint-Martens-Lennik (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 912 days.

(21) Appl. No.: 15/031,167

(22) PCT Filed: Oct. 23, 2014

(86) PCT No.: PCT/EP2014/072794
§ 371 (c)(1),
(2) Date: Apr. 21, 2016

(87) PCT Pub. No.: WO2015/059249
PCT Pub. Date: Apr. 30, 2015

(65) Prior Publication Data
US 2016/0243930 A1 Aug. 25, 2016

(30) Foreign Application Priority Data
Oct. 25, 2013 (EP) ..................................... 13190352

(51) Int. Cl.
*B60K 15/03* (2006.01)
(52) U.S. Cl.
CPC ................... *B60K 15/03177* (2013.01); *B60K 2015/03032* (2013.01); *B60K 2015/0346* (2013.01); *B60K 2015/03493* (2013.01)

(58) Field of Classification Search
CPC .. B65D 25/20; B65D 51/16; B60K 15/03177; B60K 15/077; B60K 2015/0344;
(Continued)

(56) References Cited

U.S. PATENT DOCUMENTS

| 2,407,455 | A | * | 9/1946 | Shakesby | ............... | B64D 37/02 |
| | | | | | | 220/653 |
| 4,634,028 | A | * | 1/1987 | de Larosiere | .......... | B65D 25/02 |
| | | | | | | 215/10 |

(Continued)

FOREIGN PATENT DOCUMENTS

| CA | 2 462 763 A1 | 10/2004 |
| CN | 202557283 U | † 11/2012 |

(Continued)

OTHER PUBLICATIONS

"Tensile strength" Zugfestigkeit—Lexikon der Kunststoffprüfung, PSM Polymer Service GmbH Merseburg, Oct. 17, 2018, 6 pages.
(Continued)

*Primary Examiner* — Chun Hoi Cheung
*Assistant Examiner* — Brijesh V. Patel
(74) *Attorney, Agent, or Firm* — Oblon, McClelland, Maier & Neustadt, L.L.P.

(57) ABSTRACT

A tank manufactured from a plastic material. The tank includes a reinforcement member. The reinforcement member includes a first portion made of a first material weldable to the plastic material of the tank and a second portion made of a second material having a tensile stress at break which is three to nine times larger than the tensile stress at yield of the first material. The second portion includes at least one through-hole, and the first material extends in the at least one through-hole and at opposite sides of the second portion adjacent the at least one through-hole.

17 Claims, 5 Drawing Sheets

(58) Field of Classification Search
CPC .. B60K 2015/0346; B60K 2015/03467; B60K 2015/03493; B60K 2015/03032; B60K 2015/0775
USPC .... 220/4.12–4.14, 4.21, 4.27, 501, 562–564, 220/567.2, 653, 675, 682; 156/91, 245; 29/428
See application file for complete search history.

(56) References Cited

U.S. PATENT DOCUMENTS

| | | | |
|---|---|---|---|
| 6,135,306 A * | 10/2000 | Clayton | B60K 15/03177 220/501 |
| 2005/0011891 A1 * | 1/2005 | Austerhoff | B60K 15/03006 220/4.12 |
| 2011/0139128 A1 * | 6/2011 | Zhang | F02M 37/103 123/509 |
| 2012/0037638 A1 * | 2/2012 | Criel | B29C 49/20 220/501 |
| 2012/0138606 A1 * | 6/2012 | Varga | B60K 15/03177 220/4.21 |
| 2012/0325822 A1 * | 12/2012 | Pozgainer | B60K 15/03177 220/562 |
| 2013/0008908 A1 | 1/2013 | Hill et al. | |
| 2014/0014663 A1 | 1/2014 | Eulitz et al. | |
| 2014/0158696 A1 | 6/2014 | Criel et al. | |
| 2015/0014307 A1 | 1/2015 | Pozgainer et al. | |
| 2015/0344183 A1 * | 12/2015 | Quant | B60K 15/03177 220/567.2 |

FOREIGN PATENT DOCUMENTS

| | | | |
|---|---|---|---|
| DE | 38 39 855 A1 | 5/1990 | |
| DE | 60 2004 010 946 T2 | 1/2009 | |
| DE | 10 2011 015 049 A1 | 9/2012 | |
| EP | 2 527 180 A1 | 11/2012 | |
| EP | 2 823 979 A1 | 1/2015 | |
| EP | 2845761 A1 * | 3/2015 | B60K 15/03177 |
| WO | WO 2006/008308 A1 | 1/2006 | |
| WO | WO 2010/122065 A1 | 10/2010 | |
| WO | 2012/139962 A1 | 10/2012 | |
| WO | 2012139962 A1 † | 10/2012 | |

OTHER PUBLICATIONS

Wolfgang Grellmann et al., "Tests on Synthetic Materials" Kunststoffprüfung, 2005, 8 pages.
"Hight Density Polyethylene; BA46-055 Blow Molding Resin" ExxonMobil Chemical, 2004, 1 page.
"Technical Data Sheet—Lupolen4261AG" Lyondellbasell, Nov. 23, 2017, 1 page.
"Celcon® GC25A POM Glass Reinforced" Ticona Engineering Polymers, Jan. 1, 2007, pp. 1-5.
International Search Report dated Feb. 12, 2015 in PCT/EP14/072794 Filed Oct. 23, 2014.
European Search Report dated Mar. 19, 2014 in European Application No. 13190352.8 Filed Oct. 25, 2013.
Notice of Opposition issued Jan. 30, 2017 in European Patent Application No. 2 865 553 B1.
Christoph Jaroschek, "SpritzgieBen für Praktiker" Carl Hanser Verlag München Wien, ISBN 3-466-21400-3, 2003, 12 Pages (with English language translation).
"Overmolding Guide" GLS Total TPE Solutions, 2004, 18 Pages.
European Office Action dated Mar. 7, 2019, in Patent Application No. 13 190 352.8, 32 pages.

* cited by examiner
† cited by third party

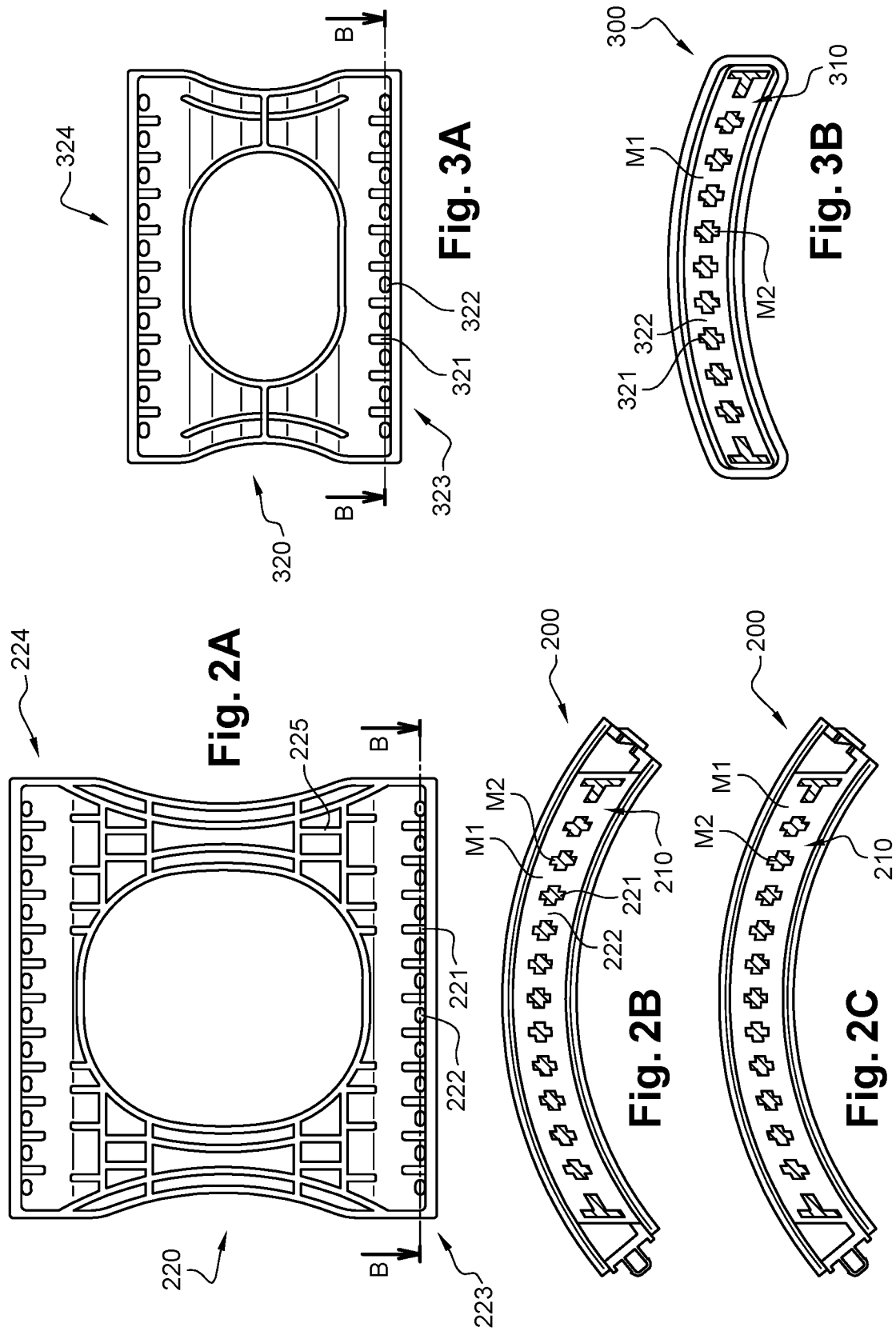

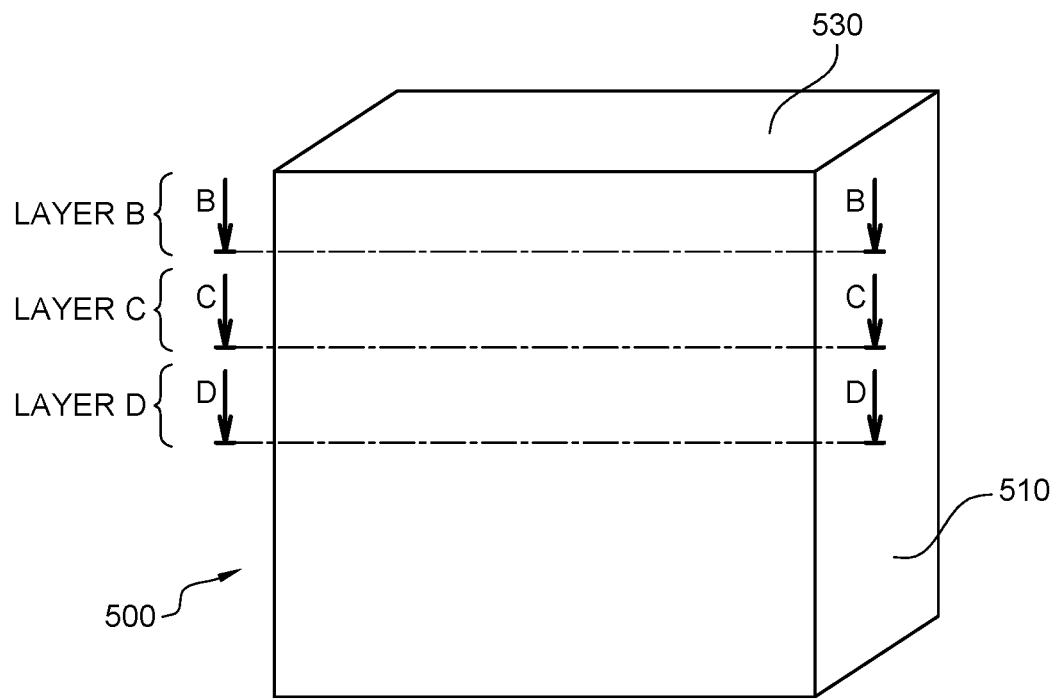
Fig. 5A
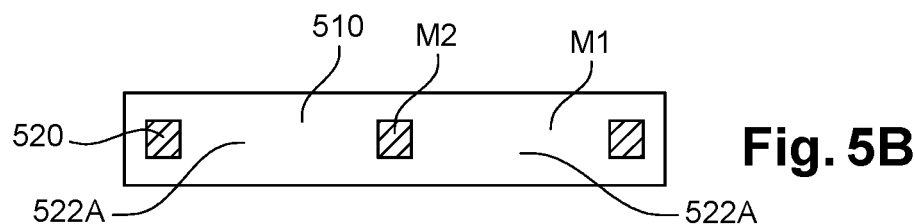
Fig. 5B
Fig. 5C
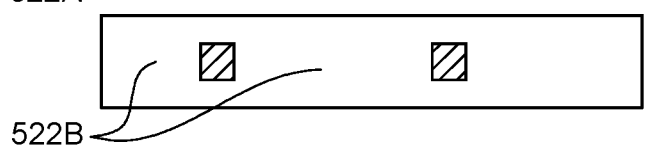
Fig. 5D
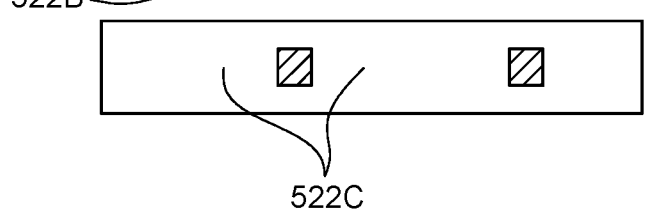
Fig. 5E
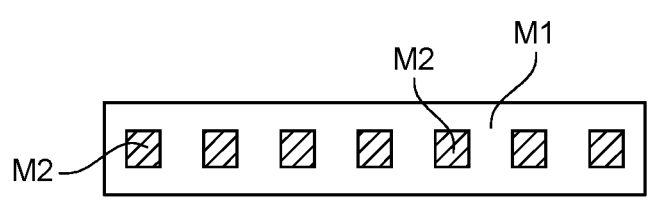

TANK COMPRISING A REINFORCEMENT MEMBER AND METHOD FOR MANUFACTURING SUCH A REINFORCEMENT MEMBER

FIELD OF THE INVENTION

The invention relates to a tank comprising a reinforcement member, in particular a fuel or an additive tank for a vehicle, and to a method for manufacturing such a reinforcement member. The invention also relates to a reinforcement member for use in a tank, and to a method for assembling a tank.

BACKGROUND

Fuel tanks assembled from two plastic shells are known, and may comprise a stabilizing column or wall in the internal volume of the tank in order to limit deformations of the tank. Traditionally fuel systems in passenger vehicles are designed to hold a specific amount of liquid fuel at a pressure essentially the same as the ambient pressure. With the introduction of Hybrid vehicles and more specifically Plug in Hybrids, which are designed such that they could potentially go several months without using fuel, it is in the interest of the system designers to hold pressure inside the fuel tank to limit the emissions that could potentially bleed through the activated carbon canister due to diurnal cycles. In addition, holding pressure ensures that the composition of the fuel stays the same during storage. However, the tanks must be made resistant to this internal pressure. Therefore tank reinforcement can be realized by linking two opposite tank surfaces with each other using an internal connecting member.

It is known to form a stabilizing connecting member in the form of a pillar or wall using a first pillar or wall part.

The pillar may be made of two materials, comprising e.g. a first portion made of a first material compatible with HDPE and a second portion of a second material having a limited deformation and/or creep.

SUMMARY

The object of embodiments of the invention is to provide a tank with a reinforcement member having an improved design in terms of volume and/or material usage and/or long-term stress resistance. A further object is to provide an improved method for manufacturing such a reinforcement member for use in a tank.

According to a first aspect of the invention there is provided a tank manufactured from a plastic material. The tank comprises a reinforcement member. The reinforcement member comprises a first portion made of a first material weldable to the plastic material of the tank; and a second portion made of a second material having a tensile stress at break which is three to nine times larger than the tensile stress at yield of the first material. The second portion comprises at least one through-hole, and the first material extends in said at least one through-hole and at opposite sides of said second portion adjacent said at least one through-hole.

Such an embodiment will result in a sufficiently strong reinforcement member capable of resisting permanent stresses that may occur in the tank, e.g. in a fuel tank of a sealed fuel system. Due to the presence of at least one through-hole, a good interlocking between the first and the second material is obtained, so that the reinforcement member may be relatively light and the weight of the tank may be reduced. By introducing a second material having a higher tensile stress, the elongation/shrinking of the reinforcement member may be reduced, even if the reinforcement member is exposed to a permanent stress generated for example by a permanent internal tank pressure. By using a second material having a tensile stress at break which is three to nine times higher than the tensile stress at yield of the first material, there is provided a good compromise between this good resistance to a permanent internal tank pressure and a good impact resistance of the fuel tank, taking into account that in impact tests the objective is to break the reinforcement member in order to prevent any leakage of fuel after such an impact. Such an improved impact resistance of the tank improves the overall crash resistance of the car.

Preferably, the second material has a tensile stress at break which is four to eight times larger than the tensile stress at yield of the first material. Surprisingly the inventors have discovered that such a ratio between the tensile stress of the first and second material provides optimal results with regard to impact resistance and durability of the tank.

In a preferred embodiment, the first material is overmoulded on the second portion, and the second portion is interlocked with the first portion through the at least one through-hole. In other words the through-hole(s) ensure an interlocking of the first part and the second part in an interlocking zone comprising the through-holes. Preferably, the reinforcement member is connected to an inner surface of the tank along a connecting plane, and the at least one through-hole has an axis which is arranged substantially parallel to the connecting plane or under a sharp angle with respect to the connecting plane. Preferably, the distance between the connecting plane and the at least one through-hole is less than 30 mm, more preferably less than 20 mm.

Preferably, the first material has a tensile stress at yield between 15 and 30 MPa at 23° C., preferably between 20 and 25 MPa at 23° C., and the second material has a tensile stress at break between 45 and 270 MPa at 23° C., preferably between 80 and 200 MPa at 23° C. The first material may comprise e.g. a polyethylene material or a polyamide material. The second material may comprise any one or more of the following materials: polyoxymethylene (POM), preferably a fiber reinforced POM, such as a glass fiber and/or aramid carbon reinforced POM, Polyphenylene sulfide (PPS), Polyphthalamide (PPA), preferably a fiber reinforced PPA, Polyether ether ketone (PEEK), Polyamide-imide (PAI), Polyaryletherketone (PAEK), metal.

Preferably, the second portion is a wall part with a plurality of through-holes, and the first portion extends around said wall part and in said through-holes. In an exemplary embodiment, the second portion is a tube-like part having an outer surface and an inner surface and the at least one through-hole between said outer surface and said inner surface, and the first material covers said inner and outer surface.

In a possible embodiment, the first portion and the second portion are shaped and dimensioned such that, seen in a section parallel to a connecting plane between the reinforcement member and an inner surface of the tank or under a sharp angle with respect to the connecting plane, a surface area occupied by the first material is between 65 and 90% of the total surface area of said section, preferably between 75 and 85% of the total surface area; and a surface area occupied by the second material is between 10 and 35% of said total surface area of said section, preferably between 15 and 25% of the total surface area. In other possible embodiments, there may be provided a plurality of through-holes extending in different layers of the reinforcement member, said layers extending parallel to a connecting plane between the reinforcement member and the tank, wherein for each layer there may be defined a central section passing through the centre of the through-holes in that layer. In such an embodiment, the first portion and the second portion may be shaped and dimensioned such that, seen in an overlay of said central sections through said plurality of layers, a surface area occupied by the first material is between 65 and 90% of the total surface area of said overlay, preferably between 75 and 85% of the total surface area; and a surface area occupied by the second material is between 10 and 35% of said total surface area of said overlay, preferably between 15 and 25% of the total surface area. In other words, in such embodiments there is made an overlay of the different central sections, and the percentages are calculated for the summed surface areas of second material in the overlay section, see also the embodiment of FIGS. 5A-E. Preferably the distance between the connecting plane and each central section is less than 30 mm, more preferably less than 20 mm.

According to a second aspect of the invention, there is provided a tank manufactured from a plastic material, said tank comprising a reinforcement member. The reinforcement member comprises a first portion made of a first material weldable to the plastic material of the tank, and at least one second portion made of at least one second material having a higher modulus of Young than the first material and/or a tensile stress at break which is higher than the tensile stress at yield of the first material. The first and second portion are shaped and dimensioned such that, seen in a section of the reinforcement member, a surface area occupied by the first material is between 65 and 90% of the total surface area of said section; and a surface area occupied by the at least one second material is between 10 and 35% of said total surface area.

Such an embodiment will result in a sufficiently strong reinforcement member capable of resisting permanent stresses that may occur in the tank, e.g. in a fuel tank of a sealed fuel system. Due to the relative low percentage of second stronger material, e.g. POM, the reinforcement member will be relatively light so that the weight of the tank, and hence the emissions of a vehicle containing such a tank may be reduced. Also, by introducing a low percentage of second stronger material the elongation/shrinking of the reinforcement member may be reduced, even if the reinforcement member is exposed to a permanent stress generated for example by a permanent internal tank pressure. The tensile stress at break, also called tensile strength or ultimate strength is the stress that a material can withstand while being stretched or pulled before failing or breaking. The tensile stress at break is usually found by performing a tensile test and recording the stress versus strain curve. The tensile stress at break, the yield stress and the E-modulus may be both obtained from stress versus strain curves. In a preferred embodiment the first material has an E modulus between 200 and 1600 MPa at 23° C. and a tensile stress at break between 15 and 30 MPa at 23° C., and the second material has an E modulus between 2000 and 3500 MPa at 23° C. and a tensile stress at break between 45 and 270 MPa at 23° C. In an exemplary embodiment, the first material is HDPE having e.g. an E modulus of 900 MPa and a tensile stress at break between 15 and 30 MPa at 23° C., and the second material is a reinforced POM material having e.g. a tensile stress at break between 100 and 200 MPa at 23° C.

Preferably, the at least one second portion is interlocked with the first portion in an interlocking zone; and the section is a section through a plane in said interlocking zone. In the context of the invention the term interlocking refers to the fact that the shape of the first and the second portion is such that the shape resists the pulling apart of the first and the second portion. In case of deformation of the first/second material, the deformation will be reduced due to the interlocking. Further, taking into account the ratio between the amount of first material and second material, a sufficient strength is obtained whilst limiting the stresses introduced in the reinforcement member due to the presence of two materials.

In a possible embodiment, the at least one second portion comprises a wall part with a plurality of through-holes, and the first portion extends around the wall part and in the through-holes. In other words, the through-holes ensure an interlocking of the first part and the second part in an interlocking zone comprising the through-holes. In a possible embodiment, the at least one second portion comprises a tube-like part having an outer surface and an inner surface and a plurality of through-holes extending from said outer surface to said inner surface, and the first portion extends around the inner and outer surface and in the through-holes. Also in such an embodiment, the through-holes ensure an interlocking of the first part and the second part in an interlocking zone comprising the through-holes. Preferably, the section having the above given ratio of first/second material is a section through at least a number of through-holes of the plurality of through-holes.

Preferably, the reinforcement member is connected to an inner surface of the tank along a connecting plane, and the section extends in a plane substantially parallel to the connecting plane. Preferably, the distance between the connecting plane and the section is less than 30 mm, more preferably less than 20 mm. Preferably, the reinforcement member extends over a certain length inside the tank, wherein along at least a part of said length, seen in a cross section of the reinforcement member, a surface area occupied by the first material is between 65 and 90% of the total surface area of said section; and a surface area occupied by the at least one second material is between 10 and 35% of said total surface area. In other words, it is advantageous if the above mentioned ratio between the first and the second material applies for a slice of the reinforcement member having a minimum height. This minimum height is preferably larger than 1 mm.

Preferably, the reinforcement member has a total height, and the at least one second portion extends over at least 80% of the total height. The above mentioned ratio may be valid for the full height of the at least one second portion, but may also be valid for only a slice of the second portion, depending on the desired properties of the reinforcement member.

In a preferred embodiment, the first portion and at least one second portion are shaped and dimensioned such that, seen in the section of the reinforcement member, a surface area occupied by the first material is between 75 and 85% of the total surface area, more preferably between 78 and 84% of the total surface area; and a surface area occupied by the at least one second material is between 15 and 25% of the total surface area, more preferably between 16 and 22% of the total surface area.

In a preferred embodiment, the tank, in particular a fuel tank or an additive tank for a vehicle, comprises a first shell and a second shell; wherein edges of said first and second shell are mutually connected such that said first and second shell together form a container delimiting an internal volume. A connecting member is provided inside the tank and extends between the first shell and said second shell. The connecting member comprises the reinforcement member. The reinforcement member may be welded to the first shell and/or to the second shell.

In a preferred embodiment, the first shell is a top shell of the tank and the second shell is a bottom shell of the tank.

Embodiments of the invention are particularly useful for gasoline fuel tanks because of the high pressure that may reign in such tanks. However, embodiments of the invention may also be used in other fuel tanks, in additive tanks, in particular tanks for diesel additives, such as urea tanks, etc. Also in applications where depressurization may occur, tanks according to embodiments of the invention will be useful.

The term "fuel tank" is understood to mean a substantially impermeable tank that can store fuel under diverse and varied environmental and usage conditions. The fuel tank according to the invention is preferably made of plastic, that is to say made of a material comprising at least one synthetic resin polymer. Particularly suitable are plastics that belong to the category of thermoplastics. The term "thermoplastic" is understood to mean any thermoplastic polymer, including thermoplastic elastomers, and blends thereof. The term "polymer" is understood to mean both homopolymers and copolymers (especially binary or ternary copolymers). Examples of such copolymers are: random copolymers, linear block copolymers, other block copolymers and graft copolymers. One polymer often employed is high-density polyethylene (HDPE). However, excellent results may also be obtained with polyamide. Preferably, the tank also comprises a layer of a fuel-impermeable resin such as, for example, EVOH (a partially hydrolysed ethylene/vinyl acetate copolymer). Alternatively, the tank may be subjected to a surface treatment (fluorination or sulphonation) for the purpose of making it impermeable to fuel. A multilayer fuel tank comprising an EVOH layer between two HDPE layers is successfully used in the frame of the invention.

In preferred embodiments, the connecting member connects two opposite wall portions of the tank, i.e. wall portions facing each other, namely a first wall portion being part of the first shell and a second wall portion being part of the second shell. Preferably, these are a lower wall portion (the one mounted facing downwards in the vehicle and which is likely to creep under the weight of the fuel) and an upper wall portion (the one mounted facing upwards and subject to little or no creep during use).

The connecting member (comprising one or more reinforcement members, or consisting of the reinforcement member) is by definition rigid, i.e. over the life of the tank, it does not deform by more than a few mm, ideally by less than 1 mm. By "deformation" in meant in fact, a change of the length thereof in the sense that it would space away or approach the two tank shells.

According to another aspect of the invention, there is provided a method for manufacturing a reinforcement member for a tank manufactured from a plastic material. The method comprises providing a second portion of a second material comprising at least one through-hole; and overmoulding said second portion with a first material such that said first material extends in said at least one through-hole and at opposite side of said second portion adjacent said at least one through-hole. The first material and the second material are chosen such that said second material has a tensile stress at break which is three to nine times larger than the tensile stress at yield of the first material, and such that the first material is weldable to said plastic material of the tank.

Preferably, the reinforcement member is connected to an inner surface of the tank along a connecting plane, wherein the distance between the connecting plane and the at least one through-hole is less than 30 mm, preferably less than 20 mm. In an advantageous embodiment, the reinforcement member is connected to an inner surface of the tank along a connecting plane, and the at least one through-hole is arranged substantially parallel to the connecting plane or under a sharp angle with respect to the connecting plane.

In a typical embodiment, the at least one second material is provided in the form of a wall part with a plurality of through-holes spread regularly over a one or more sections of the wall part, and the first material is overmoulded around the wall part and in the plurality of through-holes.

In a preferred embodiment, the second portion is overmoulded with first material such that, seen in a section parallel to a connecting plane between the reinforcement member and an inner surface of the tank or under a sharp angle with respect to the connecting plane, a surface area occupied by the first material is between 65 and 90% of the total surface area of said section, preferably between 75 and 85% of the total surface area; and a surface area occupied by the second material is between 10 and 35% of said total surface area of said section, preferably between 15 and 25% of the total surface area. In other possible embodiments, there may be provided a plurality of through-holes extending in different layers of the reinforcement member, said layers extending parallel to a connecting plane between the reinforcement member and the tank, wherein for each layer there may be defined a central section passing through the centre of the through-holes in that layer. In such an embodiment, the first portion and the second portion may be shaped and dimensioned such that, seen in an overlay of said central sections through said plurality of layers, a surface area occupied by the first material is between 65 and 90% of the total surface area of said overlay, preferably between 75 and 85% of the total surface area; and a surface area occupied by the second material is between 10 and 35% of said total surface area of said overlay, preferably between 15 and 25% of the total surface area.

The first and second material may have the properties disclosed above in connection with embodiments of the tank.

According to another aspect of the invention, there is provided a method for manufacturing a reinforcement member for a tank manufactured from a plastic material. The method comprises providing a first material and at least one second material; each second material having a tensile stress at break which is higher than the stress at yield of the first material and/or having a higher modulus of Young than the first second material, and said first material being weldable to said plastic material of the tank. The at least one second material is connected to the first material by overmoulding, in order to obtain the reinforcement member, wherein the overmoulding is performed such that, seen in a section of the obtained reinforcement member, a surface area occupied by the first material is between 65 and 90% of the total surface area of said section; and a surface area occupied by the at least one second material is between 10 and 35% of the total surface area.

In a preferred embodiment, the first material and the at least one second material are overmoulded in such a way that an interlocking between said first material and said at least one second material is obtained in an interlocking zone; wherein the section is a section through a plane of the interlocking zone.

In a possible embodiment, the at least one second material may be provided in the form of a wall part with a plurality of through-holes, and the first material is overmoulded around the wall part and in the plurality of through-holes. In a possible embodiment, the at least one second material is provided in the form of a tube-like part having an outer surface and an inner surface and a plurality of through-holes extending from said outer surface to said inner surface, and the first material is overmoulded on the inner and outer surface and in the through-holes. Preferably, the section is a section through at least a number of through-holes of the plurality of through-holes.

In a preferred embodiment, the reinforcement member is connected, e.g. welded to an inner surface of the tank in a connecting plane, and the section extends in a plane substantially parallel to the connecting plane, preferably at a distance smaller than 30 mm from the connecting plane. Preferably, the reinforcement member extends over a certain length inside the tank, wherein along at least a part of said length, seen in a section of the reinforcement member parallel to the connecting plane, a surface area occupied by the first material is between 65 and 90% of the total surface area; and a surface area occupied by the at least one second material is between 10 and 35% of the total surface area.

In a preferred embodiment the overmoulding is performed such that, seen in a section of the reinforcement member, a surface area occupied by the first material is between 70 and 85% of the total surface area, more preferably between 78 and 84% of the total surface area; and a surface area occupied by the at least one second material is between 15 and 30% of the total surface area, more preferably between 16 and 22% of the total surface area.

In a particular embodiment, the second portion made of a second material has a tensile stress at break which is three to nine times larger than the tensile stress at yield of the first material, and the first and second portion are shaped and dimensioned such that, seen in a section of the reinforcement member, a surface area occupied by the first material is between 65 and 90% of the total surface area of said section; and a surface area occupied by the at least one second material is between 10 and 35% of said total surface area. The relationship given above can be expressed by a byproduct which upper limit is given by the product between the maximum tensile stress at break of the second material and the maximum surface area occupied by the second material, and which lower limit is given by the product between the lower tensile stress at break of the second material and the lower surface area occupied by the second material. In this particular embodiment, the by-product is between 0.3 and 3.15.

Also the invention relates to a method for assembling a tank comprising providing a first shell and a second shell; putting edges of the first and second shell into contact with each other and mutually connecting said edges such that the first and second shells together form a container delimiting an internal volume; providing the first shell with a connecting member extending inwardly from an inner surface of the first shell, said connecting member comprising a reinforcement member that is being manufactured according to any one of the above disclosed embodiments of the method; and connecting the connecting member to the second shell. The edges of the shells are preferably formed by flanges. Typically the shells are made of plastic, and typically the edges of the shells are welded to each other.

According to yet another aspect, the invention relates to a tank assembled according to any one of the above disclosed assembly methods.

Finally the invention relates to a reinforcement member for use in tank or for use in a method for manufacturing a tank, wherein the reinforcement member may be provided with any of the above disclosed features.

Although certain features have been described only in connection with embodiments of the tank, the skilled person understands that corresponding features may be present in the method, and vice versa.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which:

FIG. 2A illustrates a side view of a second portion of a second embodiment of a reinforcement member of the invention (before overmoulding), and FIGS. 2B and 2C illustrate a cross section along BB of the reinforcement member including the first and the second portion (after overmoulding) for two variants (with and without clips);

FIG. 3A illustrates a side view of a second portion of a third embodiment of a reinforcement member of the invention (before overmoulding), and FIG. 3B illustrates a cross section along BB of the reinforcement member including the first and the second portion (after overmoulding);

FIG. 5A illustrates a perspective view of a reinforcement member according to a fifth embodiment; FIGS. 5B-D illustrate a cross sections along BB, CC, DD of the reinforcement member; and FIG. 5E represents an overlay of the cross sections of FIGS. 5B-D.

DESCRIPTION OF EMBODIMENTS

Figure 1A:
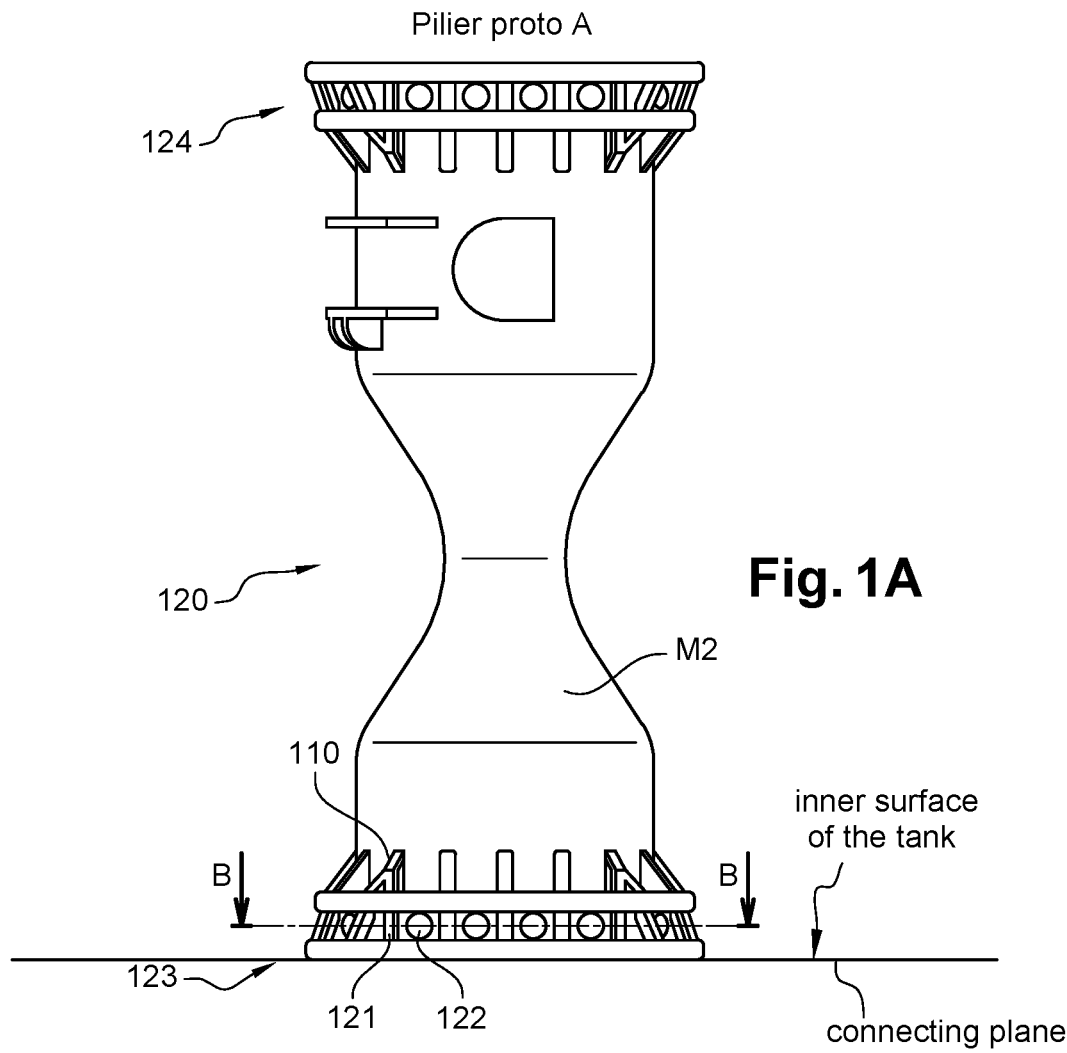
FIG. 1A illustrates a side view of a second portion of a first embodiment of a reinforcement member of the invention (before overmoulding)
Figure 1B:
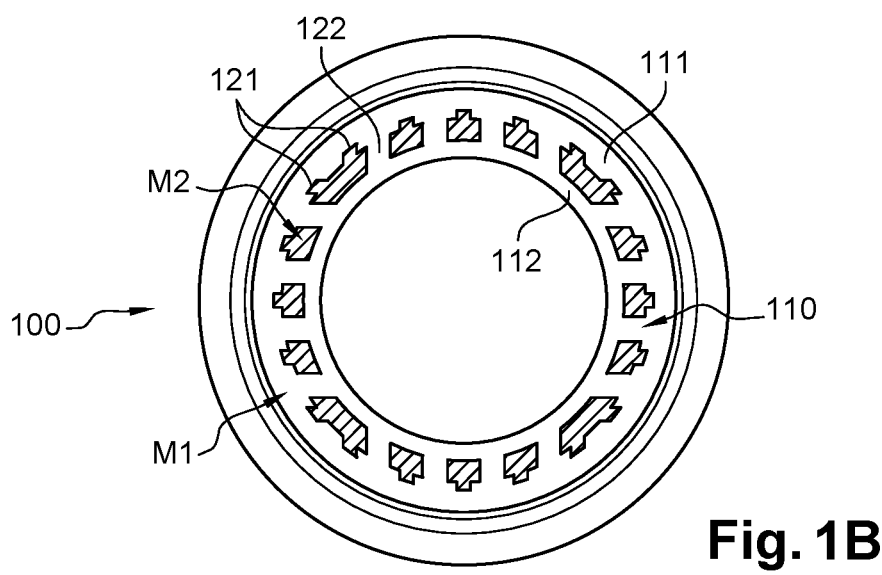
FIG. 1B illustrates a cross section along BB of the reinforcement member including the first and the second portion (after overmoulding)

FIGS. 1A-1B illustrate schematically a first embodiment of a reinforcement member 100 for a tank manufactured from a plastic material, in particular a fuel tank or an additive tank, of the invention. The reinforcement member 100 comprises a first portion 110 made of a first material M1 that is weldable to the plastic material of the tank, and a second portion 120 made of a second material M2 having a higher tensile stress at break and/or modulus of Young than the first material M1. FIG. 1A shows only the second portion 120 which is a tube-like part in the form of a pillar. This pillar is overmoulded by the first material M1 to form the reinforcement member 100. This is visible in the cross section of FIG. 1B which shows that that first material M2 is overmoulded on the outer surface and inner surface of the second portion 120 and in through-holes 122 in the pillar. As illustrated, the pillar may be provided with reinforcement ribs 121 to provide additional strength.

The provision of through-holes 122 results in an interlocking function between the first portion 110 and the second portion 120. Indeed, thanks to the through-holes 122, the second portion 120 is securely locked between an outer and inner skirt 111, 112 of the first portion 110. The dimensions of the first portion 110 and the second portion 120 are chosen such that, seen in a cross section at the level of the interlocking, i.e. at the level of the plurality of through-holes 122, a surface area occupied by the first material M1 is between 65 and 90%, preferably between 75% and 85% (e.g. approximately 80%) of the total surface area of the section; and a surface area occupied by the second material M2 is between 10 and 35%, preferably between 15 and 25% (e.g. approximately 20%) of the total surface area. Surprisingly, the inventors have found that such a ratio provides a good strength whilst limiting the stresses between the first portion and the second portion.

A first overmoulded end part 123 of the reinforcement member 100 is intended for being connected to an inner surface of the tank along a connecting plane, and a second end part 124 is intended for being connected to an opposite inner surface of the tank. Preferably, the through-holes 122 extend substantially parallel to the connecting planes.

FIGS. 2A-2C illustrate a second embodiment of a reinforcement member 200 for a tank. The reinforcement member comprises a first portion 210 of a first material M1 and a second portion 220 of a second material M2 having a higher tensile stress at break and/or modulus of Young than the first material M1. In the second embodiment, the second portion 220 takes the form of a wall part with a central recess. In an upper part 224, as well as in a lower part 223 there is provided a plurality of through-holes 222, spaced at regular intervals along the width of the wall part 220. Also the wall part 220 is provided with reinforcement ribs 221, 225. This wall part 220 is overmoulded by the first material M1 to form the reinforcement member 200. This is visible in the cross section of FIGS. 2B and 2C which show that the first portion 210 extends around the wall part 220 and in the through-holes 222.

As in the first embodiment, the provision of through-holes 222 results in an interlocking function between the first portion 210 and the second portion 220. Indeed, thanks to the through-holes 222, the second portion 220 is securely locked between a first and second outer layer of the first portion 210. The dimensions of the first portion 210 and the second portion 220 are chosen such that, seen in a cross section at the level of the interlocking, i.e. at the level of the plurality of through-holes 222 in the lower part 223 or in the upper part 224, a surface area occupied by the first material M1 is between 65 and 90%, preferably between 75% and 85% (e.g. between 81% and 84%) of the total surface area of the section, and a surface area occupied by the second material M2 is between 10 and 35%, preferably between 15 and 25% (e.g. approximately 16% and 19%) of the total surface area. This results in a compact reinforcement member having an excellent long term stress resistance.

In the second embodiment, the reinforcement member 200 is provided at its side with clips for mutually connecting adjacent reinforcement members 200. In that way there may be provided a number of mutually interconnected reinforcement members 200 in the same tank.

The third embodiment, illustrated in the FIGS. 3A-3B, is similar to the second embodiment with this difference that no clips are provided. As in the second embodiment, the reinforcement member 300 comprises a first portion 310 formed as an overmoulded portion of a first material M1 over a second portion 320 of a second material M2, wherein the second portion 320 is provided with through-holes 322 and reinforcement ribs 321.

Figure 4A:
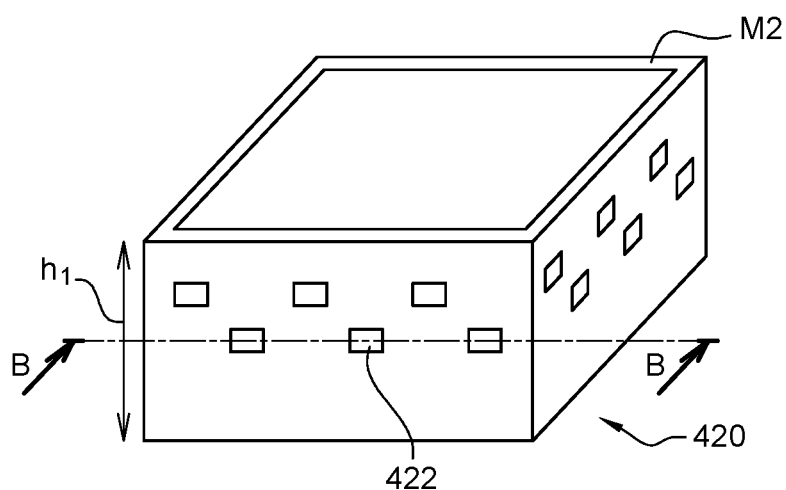
FIG. 4A illustrates a schematic perspective view of a second portion of a fourth embodiment of a reinforcement member of the invention (before overmoulding)
Figure 4B:
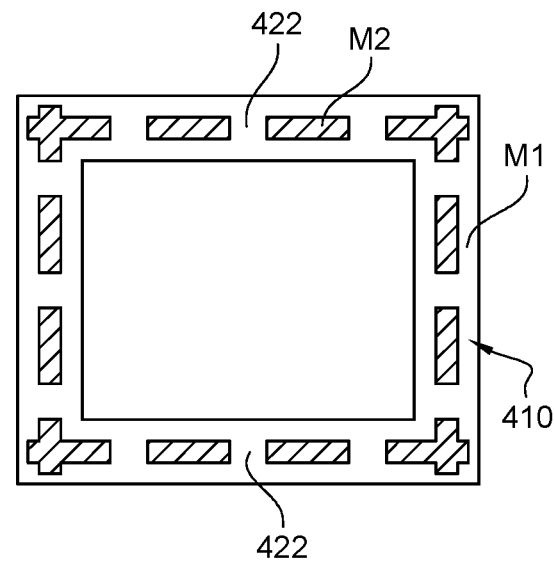
FIG. 4B illustrates a cross section along BB of the reinforcement member including the first and the second portion (after overmoulding)
Figure 4C:
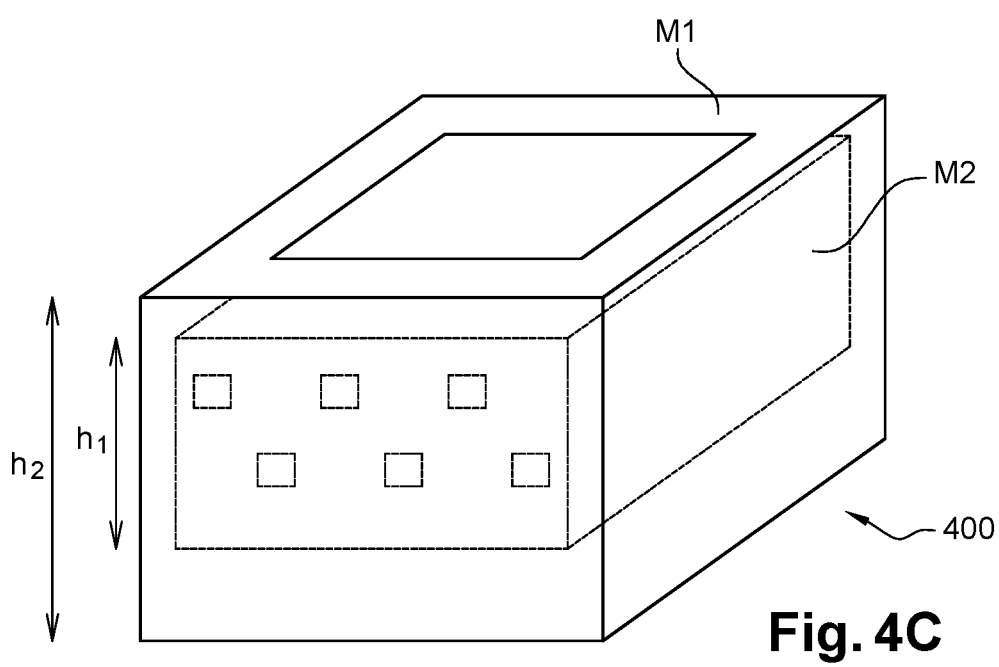
FIG. 4C illustrates a schematic perspective view of the fourth embodiment.

FIGS. 4A-C illustrate a fourth embodiment of a reinforcement member 400 for use inside a tank. The reinforcement member 400 comprises a second portion 420 of a second material M2, and a first portion 410 of a less strong first material M1. The second portion 420 is shown in FIG. 4A and takes the form of a tube like part with a rectangular cross section. The tube-like part 420 is provided at an upper end with two rows of through-holes 422, each row comprising a plurality of through-holes 422 spread regularly along a circumferential zone of the tube-like part 420. The second portion 420 has a height h1. The overmoulded reinforcement member 400 has a height h2, see FIG. 4C. Preferably, the height h1 is at least 80% of the height h2. In the fourth embodiment only the upper part of the reinforcement member is provided with an interlocking zone as a consequence of the through-holes 422. Such a reinforcement member 400 may be useful in a tank where the connecting member is formed by an upper member connected to a lower member, see also FIG. 7, wherein a first reinforcement member 400 may connected to an upper shell of the tank and a second reinforcement member 400 to a lower shell.

FIGS. 5A-E illustrate a fifth embodiment of a reinforcement member 500 for use inside a tank. The reinforcement member 500 comprises a second portion 520 (not visible in FIG. 5A) of a second material M2, and a first portion 510 of a less strong first material M1. There are provided a plurality of through-holes (not shown) extending in different layers of the reinforcement member (layers B, C, and D), said layers extending parallel to a connecting plane 530 for connecting the reinforcement member to an inner wall of the tank. For each layer A, B, C there may be defined a central section (shown in FIGS. 5B, 5C and 5D) passing through the centre of the through-holes 522A, 522B, 522C in that layer A, B, C, respectively. In such an embodiment, the first portion 510 and the second portion 520 may be shaped and dimensioned such that, seen in an overlay (FIG. 5E) of said central sections, a surface area occupied by the first material M1 is between 65 and 90% of the total surface area of the overlay, preferably between 75 and 85% of the total surface area; and a surface area occupied by the second material M2 is between 10 and 35% of said total surface area of the overlay, preferably between 15 and 25% of the total surface area, more preferably between 17% and 23%. The surface area of the second material takes into account all portions of second material (the 7 squares in FIG. 5E) in all interlocking layers. Indeed, all those portions will influence the impact resistance and durability, and the surface area of the second material is calculated taking into account the sum of all portions in the overlay.

In the fifth embodiment only the upper part of the reinforcement member is provided with an interlocking zone with a plurality of interlocking layers, but the skilled person understands that also the lower part may be provided with an interlocking zone as in the first, second and third embodiment. Moreover, the interlocking zone in the upper part may be the same as or different from the interlocking zone in the lower part.

Figure 6:
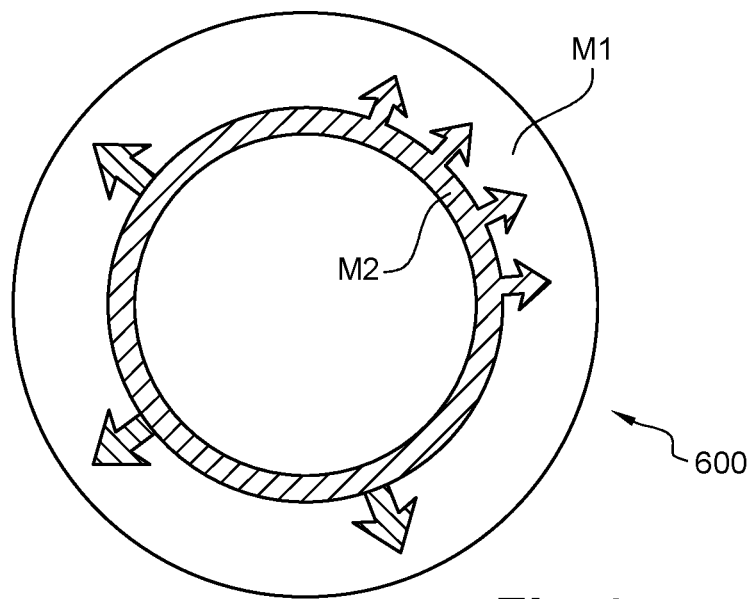
FIG. 6 illustrates a cross section of a sixth embodiment of the reinforcement member.

FIG. 6 illustrates a sixth embodiment comprising a tube like second portion of a second material M2 surrounded by a first portion of a first material M1. The interlocking is achieved through a dovetail connection. In the illustrated embodiment, the second portion is provided with dovetail ribs, but the skilled person understands that the second portion could also be provided with dovetail grooves.

Figure 7:
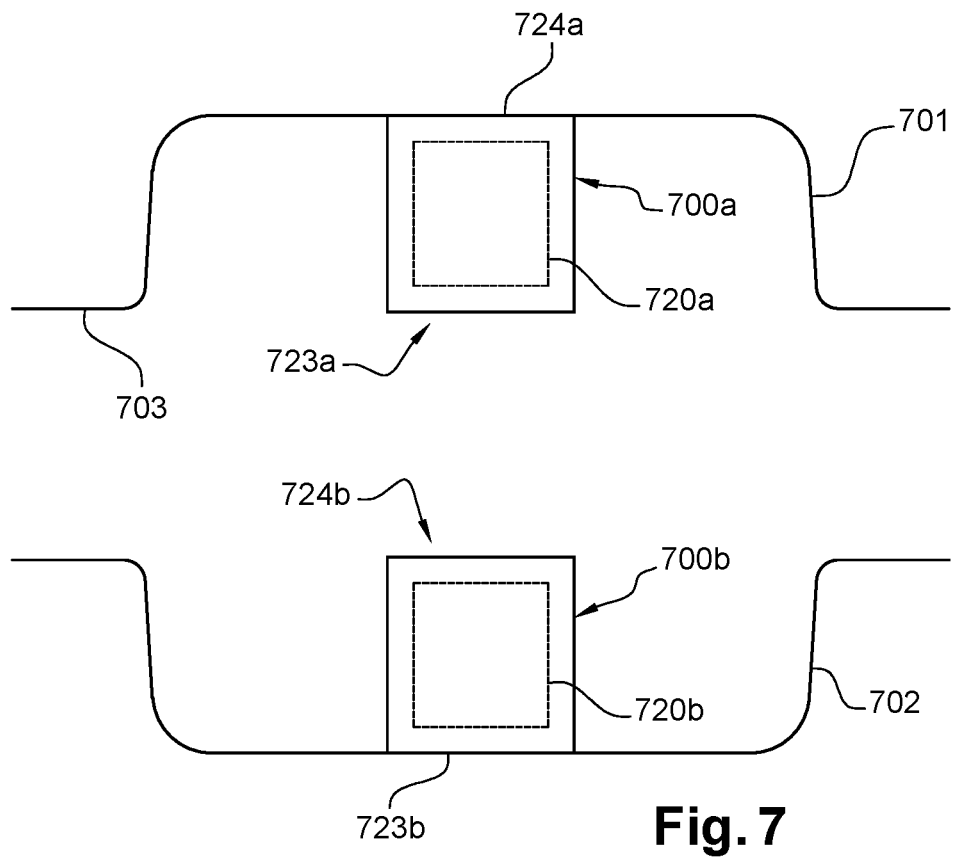
FIG. 7 illustrates an embodiment of a tank assembly including two reinforcement members.

FIG. 7 illustrates schematically a tank assembly comprising a first shell 701 and a second shell 702, wherein edges 703 of said first and second shell are mutually connected, typically welded, such that said first and second shell together form a container delimiting an internal volume. Inside the tank there is provided a connecting member 700a, 700b extending between the first shell 701 and the second shell 702. In the illustrated embodiment, the connecting member comprises an upper reinforcement member 700a with a second portion 720a and a lower reinforcement member 700b with a second portion 720b. The lower reinforcement member 700b has a lower end 723b connected to an inner surface of the lower shell 702, and the upper reinforcement member 700a has an upper part 724a connected to an inner surface of the upper shell 701. In the assembled state the lower part 723a of the upper reinforcement member 700a is connected to the upper part 724b of the lower reinforcement member 700b. Alternatively the connecting member may consist of one reinforcement member. The reinforcement member(s) may be designed according to any of the above disclosed embodiments. The first shell and/or the second shell of the tank may be moulded by any one of the following techniques or by a combination of those techniques: injection moulding, compression moulding, injection-compression moulding, thermoforming, blow moulding, extrusion blow moulding, co-injection moulding.

In the above disclosed embodiments, the tank material may be e.g. a polyethylene material and the first material M1 may also be a polyethylene material. The second material M2 may be e.g. any one of the following: POM, PPS, PPA, PEEK, PAI, PAEK, metal, wherein any of those materials may be optionally fiber reinforced.

Finally it is noted that embodiments of the invention may be combined with prior art techniques for arranging a connecting member in the tank. For example, there could be arranged a first reinforcement member in the tank in accordance with embodiments of the invention, and a second reinforcement member integrally moulded with the first shell having an end part that is connected to the second shell.

Whilst the principles of the invention have been set out above in connection with specific embodiments, it is to be understood that this description is merely made by way of example and not as a limitation of the scope of protection which is determined by the appended claims.

The invention claimed is:

1. A tank manufactured from a plastic material, the tank comprising:
   a reinforcement member, the reinforcement member comprising:
      a first portion made of a first material weldable to the plastic material of the tank;
      a second portion made of a second material having a tensile stress at break which is three to nine times larger than the tensile stress at yield of the first material;
      wherein the second portion comprises at least one through-hole, and the first material extends in the at least one through-hole and at opposite sides of the second portion adjacent the at least one through-hole;
      wherein the first portion and the second portion are shaped and dimensioned such that, seen in a section parallel to a connecting plane between the reinforcement member and an inner surface of the tank, a surface area occupied by the first material is between 65 and 90% of the total surface area of said section; and a surface area occupied by the second material is between 10% and 35% of said total surface area of said section.

2. The tank of claim 1, wherein the second material has a tensile stress at break which is four to eight times larger than the tensile stress at yield of the first material.

3. The tank of claim 1, wherein the first material is overmolded on the second portion, and the second portion is interlocked with the first portion through the at least one through-hole.

4. The tank of claim 1, wherein distance between the connecting plane and the at least one through-hole is less than 30 mm.

5. The tank of claim 1, wherein the first material has a tensile stress at yield between 15 and 30 MPa at 23° C., and the second material has a tensile stress at break between 45 and 270 MPa at 23° C.

6. The tank of claim 1, wherein the first material is a polyethylene material or a polyamide material.

7. The tank of claim 1, wherein the second material comprises at least one or more of the following materials: polyoxymethylene (POM), a fiber reinforced POM, Polyphenylene sulfide (PPS), Polyphthalamide (PPA), a fiber reinforced PPA, Polyether ether ketone (PEEK), Polyamide-imide (PAI), Polyaryletherketone (PAEK), metal.

8. The tank of claim 1, wherein a plurality of through-holes extend in different layers of the reinforcement member, the layers extending parallel to a connecting plane between the reinforcement member and the tank, wherein each layer has a central section passing through the center of the through-holes in that layer,
   wherein the first portion and the second portion are shaped and dimensioned such that, seen in an overlay of the central sections through the plurality of layers, a surface area occupied by the first material is between 65 and 90% of the total surface area of the overlay; and a surface area occupied by the second material is between 10 and 35% of the total surface area of the overlay.

9. The tank of claim 1, further comprising:
   a first shell and a second shell;
   wherein edges of the first shell and the second shell are mutually connected such that the first shell and the second shell together form a container delimiting an internal volume;
   a connecting member provided inside the tank, the connecting member extending between the first shell and the second shell; and
   the connecting member comprising the reinforcement member.

10. The tank of claim 9, wherein the reinforcement member is welded to the first shell, or to the second shell, or to the first shell and the second shell.

11. The tank of claim 1, wherein the reinforcement member is connected to an inner surface of the tank along a connecting plane, and wherein the at least one through-hole has an axis which is arranged parallel to said connecting plane.

12. A method for manufacturing a reinforcement member for a tank manufactured from a plastic material, the method comprising:
   providing a second portion of a second material including at least one through-hole;
   overmolding the second portion with a first material such that the first material extends in the at least one through-hole and at opposite sides of the second portion adjacent the at least one through-hole;

wherein the first portion and the second portion are shaped and dimensioned such that, seen in a section parallel to a connecting plane between the reinforcement member and an inner surface of the tank, a surface area occupied by the first material is between 65 and 90% of the total surface area of said section; and a surface area occupied by the second material is between 10% and 35% of said total surface area of said section; and wherein for the first material and the second material, the second material has a tensile stress at break which is three to nine times larger than the tensile stress at yield of the first material, and such that the first material is weldable to the plastic material of the tank.

13. The method of claim 12, wherein the distance between the connecting plane and the at least one through-hole is less than 30 mm.

14. A method for assembling a tank comprising:

providing a first shell and a second shell;

putting edges of the first shell and the second shell into contact with each other and mutually connecting the edges such that the first shell and the second shell together form a container delimiting an internal volume;

providing the first shell with a connecting member extending inwardly from an inner surface of the first shell, the connecting member comprising a reinforcement member that is being manufactured according to the method of claim 12; and connecting the connecting member to the second shell.

15. The method of claim 12, wherein the reinforcement member is connected to an inner surface of the tank along a connecting plane, and wherein the at least one through-hole has an axis which is arranged parallel to said connecting plane.

16. A tank manufactured from a plastic material, the tank comprising:

a reinforcement member, the reinforcement member comprising:

a first portion made of a first material weldable to the plastic material of the tank;

a second portion made of a second material;

wherein the second portion comprises at least one through-hole, and the first material extends in the at least one through-hole and at opposite sides of the second portion adjacent the at least one through-hole;

wherein the first portion and the second portion are shaped and dimensioned such that, seen in a section parallel to a connecting plane between the reinforcement member and an inner surface of the tank, a surface area occupied by the first material is between 65 and 90% of the total surface area of said section; and a surface area occupied by the second material is between 10% and 35% of said total surface area of said section; and wherein a by-product between the tensile stress at break of the second material and the surface area occupied by the second material over the total surface area of a section parallel to a connecting plane between the reinforcement member and an inner surface of the tank is between 0.3 and 3.15.

17. The tank of claim 16, wherein the reinforcement member is connected to an inner surface of the tank along a connecting plane, and wherein the at least one through-hole has an axis which is arranged parallel to said connecting plane.

\* \* \* \* \*